(12) United States Patent
Robbins et al.

(10) Patent No.: US 8,149,859 B2
(45) Date of Patent: Apr. 3, 2012

(54) METHOD FOR MANAGING DELIVERY OF MULTICAST TRAFFIC TO DEVICES

(75) Inventors: Max Leo Robbins, Portage, IN (US); Karl Schmidt, Lisle, IL (US)

(73) Assignee: ARRIS Group, Inc., Suwanee, GA (US)

( * ) Notice: Subject to any disclaimer, the term of this patent is extended or adjusted under 35 U.S.C. 154(b) by 693 days.

(21) Appl. No.: 11/761,231

(22) Filed: Jun. 11, 2007

(65) Prior Publication Data
US 2008/0056293 A1    Mar. 6, 2008

Related U.S. Application Data

(60) Provisional application No. 60/812,462, filed on Jun. 9, 2006.

(51) Int. Cl.
*H04J 3/26* (2006.01)
*H04N 7/173* (2011.01)

(52) U.S. Cl. ......................................... 370/432; 725/118

(58) Field of Classification Search ................... 370/390, 370/320, 432; 709/239, 203, 238
See application file for complete search history.

(56) References Cited

U.S. PATENT DOCUMENTS

| | | | |
|---|---|---|---|
| 6,065,061 A * | 5/2000 | Blahut et al. | 709/239 |
| 6,510,162 B1 * | 1/2003 | Fijolek et al. | 370/432 |
| 7,408,877 B2 * | 8/2008 | Chandran et al. | 370/230 |
| 2002/0108116 A1 * | 8/2002 | Dillon | 725/63 |
| 2006/0153219 A1 * | 7/2006 | Wong et al. | 370/432 |
| 2007/0153820 A1 * | 7/2007 | Gould | 370/432 |
| 2007/0177594 A1 * | 8/2007 | Kompella | 370/390 |
| 2009/0019509 A1 * | 1/2009 | Horn et al. | 725/118 |

* cited by examiner

*Primary Examiner* — John Blanton
(74) *Attorney, Agent, or Firm* — Troy A. Van Aacken; Robert J. Starr

(57) ABSTRACT

Multicast management messages associate a channel with one or more multicast groups. The information included in the multicast management messages are combined into a channel association table that may be stored at a CPE device for each of one or more interfaces. The channel association table is used in response to a request for a desired multicast group to select a channel over which the desired multicast group should be delivered. The channel selection is based on a review of the channel association table. If a channel is associated with the desired group, it is selected. If a channel is not associated with the desired group, a channel is selected from a plurality of available channels based on group traffic loading criteria. A multicast message, such as a JOIN, is forwarded to other devices informing them that the desired group should only be sought and/or delivered on the selected channel.

17 Claims, 3 Drawing Sheets

METHOD FOR MANAGING DELIVERY OF MULTICAST TRAFFIC TO DEVICES

CROSS REFERENCE TO RELATED APPLICATION

This application claims the benefit of priority under 35 U.S.C. 119(e) to the filing date of Robbins, et. al., U.S. provisional patent application No. 60/812,462 entitled "Method for managing multicast traffic across nodes having multiple shared-media, interfaces," which was filed Jun. 9, 2006, and is incorporated herein by reference in its entirety.

FIELD OF THE INVENTION

This invention relates, generally, to communication networks and, more particularly, to efficient usage of bandwidth in a channel bonded environment.

BACKGROUND

Modern communication networks typically support three classes of traffic: unicast, broadcast, and multicast. Traffic that is sourced from a single device on the network and destined for a single device on the network is typically referred to in the art as unicast. Traffic that is sourced from a single device on the network and destined for all devices on the network is typically referred to in the art as broadcast. Traffic that is sourced from a single device on the network and destined for a subset of devices on the network is typically referred to as multicast traffic. Multicast traffic for a given program, e.g. a high definition television ("HDTV") program, may include multiple traffic streams related to the HDTV program For network operators, such as, for example, community antenna television ("CATV") operators, also referred to as multiple systems operators ("MSO"), multicast traffic delivery offers two primary benefits, among other, over unicast or broadcast traffic delivery. First, multicast delivery reduces the total network bandwidth required to deliver a given stream of data to a given number of devices. Second, multicast reception of a given stream may be restricted to only those requesting devices that are interested and/or authorized. When a stream of data is delivered to a subset of the given number of devices via unicast, a copy of the stream is transmitted over the communication network for each device in the receiving subset. With n devices in the receiving subset, the bandwidth required is n times that of the stream itself. On the other hand, if a stream of data is delivered to a subset of devices via broadcast, then all devices in the network would receive and process the stream. Subscription-based content that is delivered in real time (e.g., audio or video) is a prime candidate for multicast transmission.

The subset of devices on a network that are simultaneously receiving a given multicast stream is referred to as a multicast group. Those skilled in the art may also apply the terra multicast group to a multicast stream itself. In other words, a multicast group may be a specific stream of multicast data received by a specific subset of devices on a communication network. For example, two real-time videos transmitted via multicast represent two multicast groups since each video could potentially have a different subset of devices receiving it.

When a device elects to receive a given multicast group, it sends a multicast management protocol message (e.g., IGMP) into the network identifying the group it seeks to join. This message is typically referred to as a JOIN message. Control devices in the network such as routers or CMTSs receive this JOIN message and ensure that multicast group of interest is routed to the requesting device.

Most devices on a network support a single interface to the network. However with the advent of channel bonding technologies deployed in systems that, for example, use the Data Over Cable Service Interface Specification ("DOCSIS") version 3.0, newer high-speed network devices at a customer's premises, sometimes referred to as customer premise equipment ("CPE"), may have multiple interfaces (i.e. tuner circuitry) to the communication network, such as, for example, a hybrid fiber coaxial ("HFC") network. A single CPE device at a home or office location may provide connectivity to the HFC for multiple user devices, such as, for example, a personal computer ("PC"), a set top box for delivering video and other programming, or another such device that transmits and receives data and information to and from an HFC, or other network. It will be appreciated that channel bonding may also be used in other technologies such as, for example, digital subscriber line, other broadband communication networks and Ethernet.

CPE devices designed for channel bonding can support higher bandwidths than traditional single-interface devices since data streams may be received over multiple channels through multiple interfaces. In a network environment with multiple CPE devices, each having multiple shared-media interfaces/channels, there are potentially many viable routing possibilities for a given multicast group. That is, there are many paths within the network, for example, an HFC network, that a given multicast group can take from a central device, such as, for example, a web server or a video-on-demand (VOD) server to reach a given device or set of CPE devices, such as, for example, cable modems ("CM").

FIG. 1 illustrate n devices 2 (Device 0, Device 1, . . . , Device n) that are served by four shared-media channels 4 (C0, C1, C2, and C3). In the example, all the CPE devices 2 belong to multicast traffic group A (i.e., are receiving multicast group A traffic), but Device 0 receives the multicast group traffic via C0, Device 1 receives the group via C1, and Device n receives the group via C3. Thus, since all CPEs 2 can access any of the channels C0-C3, there are two extraneous transmissions of multicast group A. The result of the extra channel use is that bandwidth used over HFC channels 4 to deliver the multicast group traffic flow from router 6, which may also be a cable modem termination system ("CMTS"), is three times greater than needed. Generally, a network supporting devices with multiple shared-media interfaces, for example, a DOCSIS 3.0 downstream channel bonding network, or a multi-interface Ethernet network device, may waste an appreciable amount of bandwidth due to redundant copies of the same multicast group being carried over multiple channels. Association table 8 illustrates that multicast group A traffic is associated with all the channels C0-C3 that CPE devices 2 are receiving.

Bandwidth requirements for multicast traffic may be reduced if the number of redundant copies of a given multicast group can be minimized. As shown in FIG. 2, n devices 2 are served by the same four shared-media channels (C0, C1, C2, and C3) as in FIG. 1. All devices belong to multicast group A, and all devices receive the group via C1. However, there are no transmissions of group A over other channels. Consequently, no additional bandwidth required beyond what is used to carry one copy of group A is used. Thus, bandwidth over HFC channels 4 is used more efficiently, as the channels that would otherwise be carrying duplicates of group A can now be used to carry other information traffic, such as data, to another user device coupled to one of CPE devices 2. Association table 8 in FIG. 2 shows that multicast group A traffic is now only associated with channel C1, whereas in FIG. 1, the association table showed that group A was associated with all channels C0-C3.

Although reducing, or eliminating, the number of channels that carry a desired, or given, multicast group is desirable, efficient use of bandwidth achieved by using only one of the multiple channels that serve CPEs 2 typically is only achieved by random occurrence. Thus, there is a need in the art for a method and system for automatically detecting when multiple channels that are currently tuned and accessible by interfaces/tuner circuits of multi-interface CPE devices are receiving the same multi cast group over more than one channel. Furthermore, there is a need in the art for a method and system for efficiently eliminating replication of a multicast group over multiple channels that are tuned by interface circuitry of multi-interface CPE devices.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 3:
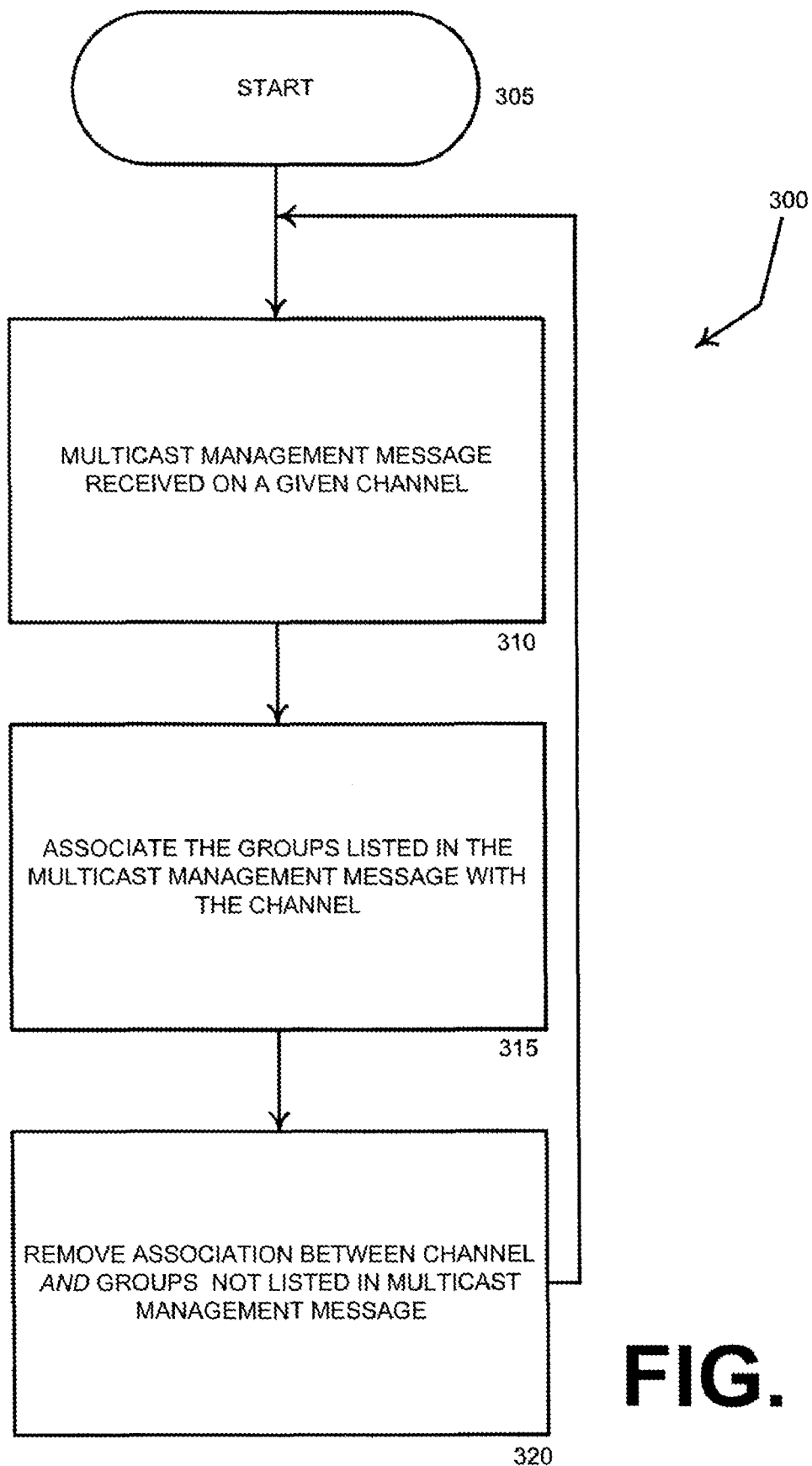
FIG. 3 updating a channel association table that associates one or more channels with multicast groups that they carry.

Turning now to the figures, FIG. 3 illustrates a method 300 for updating a channel association table corresponding to a CPE. Multicast management message snooping may be used, or other similar method known to those skilled in the art of updating an information set based on periodic or occasional information messaging on a network. Method 300 starts at step 305 and a first multicast management message is received at step 310. The first multicast management message may be an Internet Group Management Protocol ("IGMP") message sent periodically or occasionally from a central device, such as a router or CMTS to which the one or more CPE devices are coupled. It will be appreciated that when used in a CPE device having multiple interfaces (an interface including corresponding tuner circuitry, for example), for tuning to multiple channels simultaneously, method 300 may be performed at the CPE for each interface separately. Thus, it will be appreciated that for purposes of clarity, method 300 is described herein with respect to one interface. However, a CPE typically has a single channel association table corresponding to it that includes associations for all interfaces.

Information delivered in the first multicast management message may include a listing of multicast groups available at the receiving interface. At step 315, the information included in the first multicast management message received at step 310 may be used to update existing channel association table information. The channel association table may be stored at the given CPE device which includes the interface for which method 300 is being performed. All of the channels over which a particular multicast group is available are associated with the particular multicast group in the channel association table, an example of which is shown as table 8 in FIGS. 1 and 2.

Continuing with the description of FIG. 3, after the channel association table has been updated with channels over which given multicast groups are available, the table is further analyzed at step 320. At step 320, channel associations that may have been made during previous iterations of method 300 are compared to the information contained in the most recent multicast management message received at step 305. Channel associations that are present in the association table, but that are not included in the most recent first multicast management message are removed from the channel association table at step 320. After the association table has been updated at steps 310 and 320, method 300 returns to the beginning of the method and waits to receive another first multicast management message at step 310. Thus, for each interface, or tuner circuitry, at a given CPE device, a channel association table is routinely updated (may be periodic, as-requested, as needed due to new channel associations at the central device, etc.) so that a channel carrying a desired multicast group can be determined by the CPE device. It will be appreciated that a user device, such as, for example, a set top box, a PC or other user device that may receive multimedia content, including music and video, over IP, may typically request a given multicast group based on a channel guide that is periodically delivered to such user devices.

Figure 1:
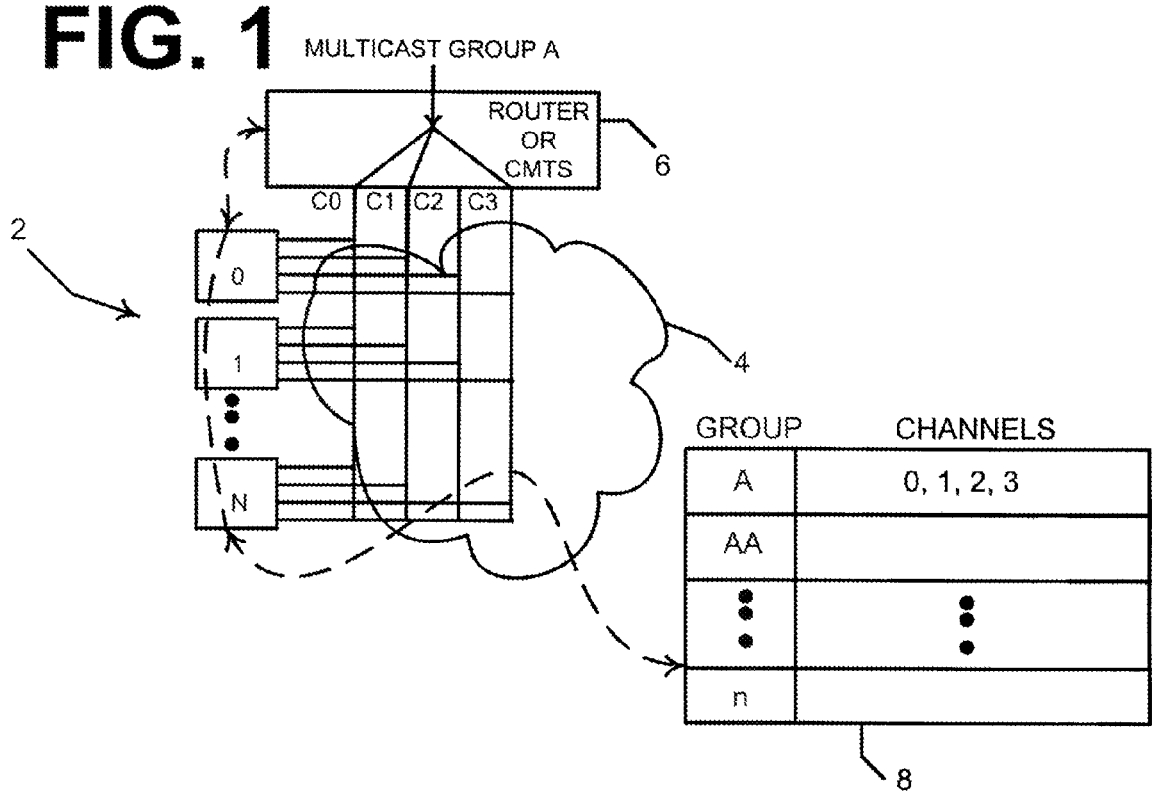
FIG. 1 illustrates duplication of a multicast group over multiple channels serving multiple CPE devices.
Figure 2:
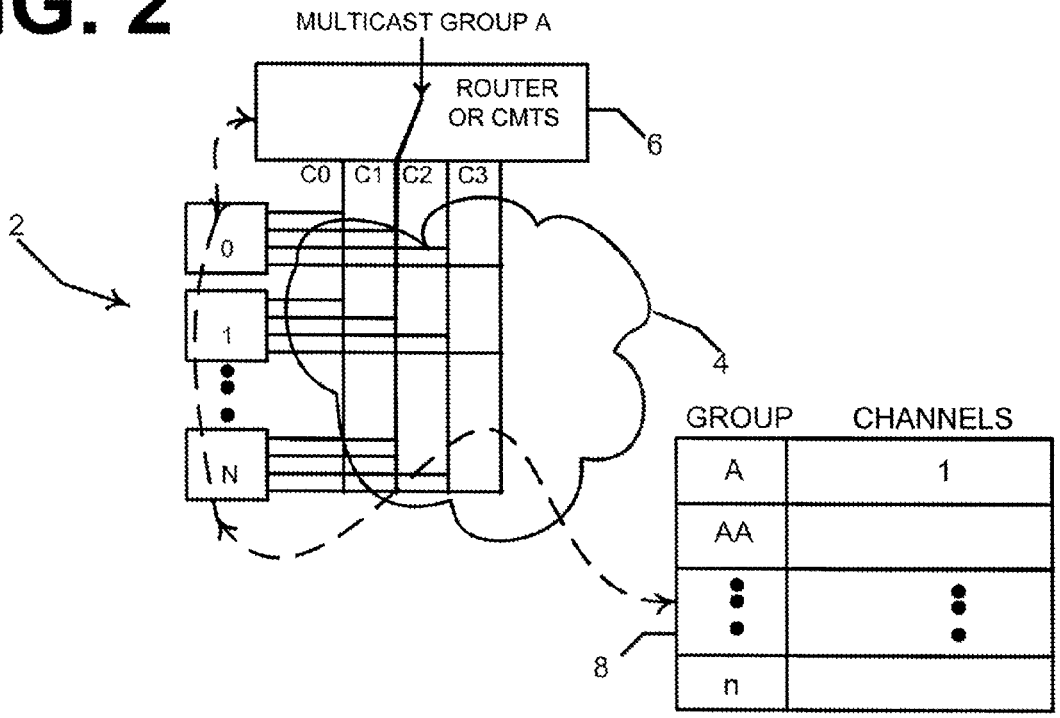
FIG. 2 illustrates transmission of a multicast group over a channel serving multiple CPE devices.
Figure 4:
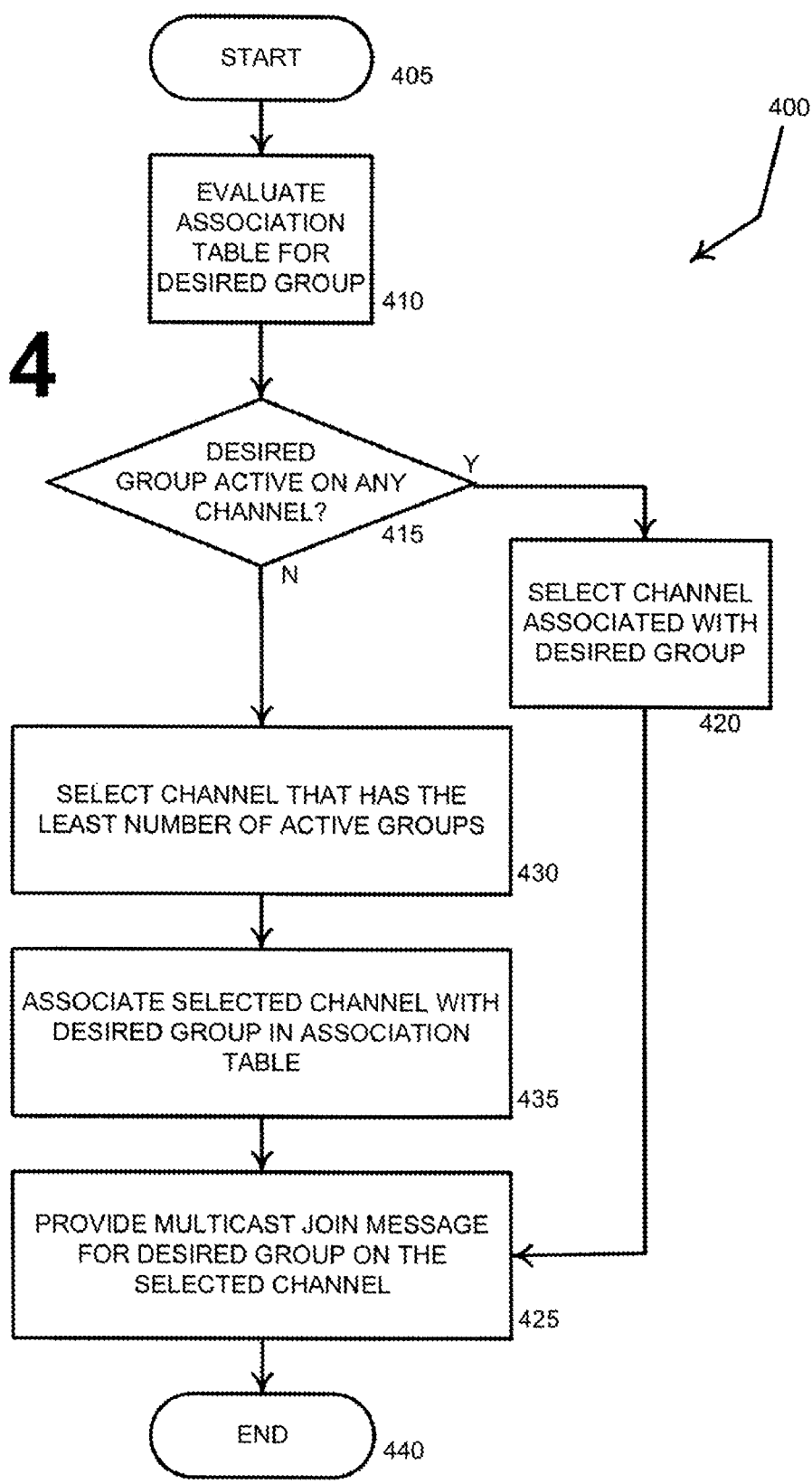
FIG. 4 illustrates a flow diagram for using an updated association table to issue a multicast join message for a desired group on a selected channel.

Turning now to FIG. 4, a method for using an updated channel association table to issue a second multicast management message, such as a multicast JOIN message, from a particular given CPE for a desired group on a selected channel is illustrated. Method 400 starts at step 405. An evaluation of the channel association table described in reference to FIGS. 1, 2 and 3 is made at step 410 in response to a request from a user device to receive a desired multicast group. After evaluating the channel association table at step 410, a determination is made at step 415 whether the desired multicast group is available on any channel, whether to the given CPE device, or any other CPE devices that are coupled to the same central device via one or more of the same interfaces as the given CPE device in connection with which the evaluation was performed.

As discussed above in reference to other figures, more than one channel may be associated with a given multicast group. Even if more than one channel is associated with a desired multicast group, method 400 advances from step 415 as soon as a channel is determined to be associated with the desired multicast channel. Thus, the first channel encountered during the determination at step 415 is selected at step 420 as the channel that should be used to receive the desired multicast group.

At step 425, a second multicast management message, such as an IGMP JOIN message is sent from the given CPE device that serves the user device making the group request. The second multicast management message/JOIN message is sent from the CPE to the communication network, typically an HFC or Ethernet network, to which other network devices, such as other CPE devices having other user devices coupled thereto, are coupled. Other network devices may then use the information contained in the JOIN message when attempting to receive the same desired multicast group. In other words, if a device coupled to CPE A sends a request message for a desired multicast group, CPE A performs steps 410-420, determines that the desired group is available to it on channel C3 and forwards a JOIN message to the network that any other CPE device coupled to a user device requesting the same desired group should use channel C3 to receive the same desired group. When the multicast JOIN message is sent at step 425 for the desired group to be delivered over the selected channel, channel association tables of other devices are updated so that only the selected channel is associated with the desired group. Thus, multiple channel associations with a particular multicast group are reduced, or eliminated.

Returning to the determination at step 415, if the results of the review of the channel association table performed at step 410 do not indicate that there is a current channel available to the requesting CPE/user device, then method 400 advances to step 430. At step 430, a review of the channels that are available at the requesting given CPE is performed and the currently available channel—to which the requesting CPE may or may not be tuned—currently carrying the least number of multicast groups is selected. This lowest-loaded channel is associated with the desired multicast group in the channel association table corresponding to the given CPE device at step 435. Then, a multicast JOIN is sent into the network instructing that the desired multicast group be made available on the selected channel at step 425 as described above. Method 400 ends at step 440.

Thus, method 400 provides for selecting a channel over which a desired multicast group should be carried, and based on updated channel association table information, instructs network devices, including a CMTS, that only one channel should be used to deliver a given desired multicast group to a plurality of CPE devices that can access the same channels.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for minimizing the number of channels making available a multicast group to a plurality of CPE devices, comprising:
receiving a plurality of first multicast management messages on each of a plurality of CPE interfaces available to a first CPE device, each of the plurality of first multicast management messages being respectively associated with one of the plurality of CPE interfaces, and each of the first multicast management messages including information that associates one or more multicast groups with a channel operable to deliver the each of the plurality of multicast groups, the channel being based upon the interface at which a respective multicast management message was received;
associating all channels that are associated with respective multicast groups from the plurality of multicast groups in the plurality of first multicast management messages with their corresponding multicast group or groups in a channel association table; and
removing previously associated channel associations with a corresponding multicast group, or groups, from the channel association table that are not included in the plurality of first multicast management messages;
determining that a particular multicast group is populated on multiple channels received at the first CPE device;
sending a notification to a central device that the multicast group is populated on multiple channels received at the first CPE device based on the determination.

2. The method of claim 1 further comprising:
determining whether a desired multicast group is available on a channel that can be accessed by a given CPE device based on the channel association table;
selecting a channel from the channel association table that is associated with the desired multicast group.

3. The method of claim 2 wherein the central device is a CMTS.

4. The method of claim 2 wherein the second multicast management message is a multicast JOIN message.

5. The method of claim 1 further comprising:
evaluating the channel association table;
determining whether a desired multicast group is available on a channel that can be accessed by a given CPE device based on the evaluation of the channel association table;
selecting a channel that is associated with the fewest number of multicast groups if the desired multicast group is not associated with any of the channels that the given CPE can access based on the evaluation of the channel association table;
associating the selected channel with the desired multicast group in the channel association table.

6. The method of claim 5 wherein the central device is a router.

7. The method of claim 5 wherein the second multicast management message is a multicast JOIN message.

8. The method of claim 1 wherein the first multicast management message is an IGMP message.

9. The method of claim 1 wherein an interface includes tuner circuitry.

10. A method for minimizing the number of channels making available a multicast group to a plurality of CPE devices, comprising:
receiving a plurality of first multicast management messages at each of a plurality of CPE device interfaces available to a first CPE device, each of the plurality of first multicast management messages being respectively associated with one of the plurality of CPE interfaces, and each of the first multicast management messages including information that associates one or more multicast groups with a channel operable to deliver the each of the plurality of multicast groups, the channel being based upon the interface at which a respective multicast management message was received;
associating all channels that are associated with respective multicast groups from the plurality of multicast groups in the plurality of first multicast management messages with their corresponding multicast groups or groups in a channel association table;
removing previously associated channel associations with a corresponding multicast group, or groups, from the channel association table that are not included in the plurality of first multicast management messages;
evaluating the channel association table;

determining whether a desired multicast group is available on a channel that can be accessed by a given CPE device based on the evaluation of the channel association table;

selecting a channel from the channel association table that is associated with the desired multicast group; and providing a second multicast management message to a network to which the given CPE is coupled to join an existing multicast group; determining that a particular multicast group is populated on multiple channels received at the first CPE device; sending a notification to the network that the multicast group is populated on multiple channels received at the first CPE device based on the determination.

11. A method for minimizing the number of channels making available a multicast group to a plurality of CPE devices, comprising:

receiving a plurality of first multicast management messages on each of a plurality of CPE interfaces available to a first CPE device, each of the plurality of first multicast management messages being respectively associated with one of the plurality of CPE interfaces, and each of the first multicast management messages including information that associates one or more multicast groups with a channel operable to deliver the each of the plurality of multicast groups, the channel being based upon the interface at which a respective multicast management message was received;

associating all channels that are associated with each of the plurality of multicast groups in the first multicast management message with their corresponding multicast groups or groups in a channel association table;

removing previously associated channel associations with a corresponding multicast group, or groups, from the channel association table that are not included in the plurality of first multicast management messages;

evaluating the channel association table;

determining whether a desired multicast group is available on a channel that can be accessed by a given CPE device based on the evaluation of the channel association table;

selecting a channel that is associated with the fewest number of multicast groups if the desired multicast group is not associated with any of the channels that the given CPE can access based on the evaluation of the channel association table;

associating the selected channel with the desired multicast group in the channel association table; and providing a second multicast management message to a network to which the given CPE is coupled, the second multicast management message including instruction that the desired multicast group should only be delivered on the selected channel to all CPE devices coupled to a central device to which the given CPE device is coupled; determining that a particular multicast group is populated on multiple channels received at the first CPE device; sending a notification to the central device that the multicast group is populated on multiple channels received at the first CPE device based on the determination.

12. A method for minimizing the number of channels making available a multicast group to a plurality of CPE devices coupled to a central device, comprising:

generating a plurality of first multicast management messages, each of the plurality of first multicast management messages being respectively associated with one of a plurality of channels, and each of the first multicast management messages including information that associates each of a plurality of multicast groups with one of the plurality of channels, the associated channel being operable to deliver a respective multicast group;

associating at a CPE device all channels that are associated with each of the plurality of multicast groups in the plurality of first multicast management messages received at the CPE device along with their corresponding multicast groups or groups in a channel association table;

removing at the CPE device previously associated channel associations with a corresponding multicast group, or groups, from the channel association table that are not included in the received first multicast management message;

selecting a channel to deliver a desired multicast group to a plurality of CPE devices from a central device; and altering routing configuration at the central device based on the selected channel so that the desired multicast group is provided from the central device only over the selected channel; determining that a particular multicast group is populated on multiple channels received at the first CPE device; sending a notification to the central device that the multicast group is populated on multiple channels received at the first CPE device based on the determination.

13. The method of claim 12 wherein the central device is a CMTS.

14. The method of claim 13 wherein altering routing configuration includes switching routing paths between an input and an output port, to which the CPE devices are coupled, so that the desired multicast group is made available from the central device to the CPE devices over only the selected channel.

15. The method of claim 12 wherein the central device is a router.

16. The method of claim 15 wherein the router is an internet protocol router.

17. The method of claim 15 wherein altering routing configuration includes updating routing tables and address information so that the desired multicast group is made available from the central device to the CPE devices over only the selected channel.

* * * * *